Patented Feb. 2, 1954

2,668,174

UNITED STATES PATENT OFFICE 2,668,174

MONOPROPYL DIXYLYL PHOSPHATE AND PROCESS

William B. Horback, Irvington, Frank Berardinelli, South Orange, and Walter D. Paist, Berkeley Heights, N. J., assignors to Celanese Corporation of America, New York, N. Y., a corporation of Delaware No Drawing. Original application August 15, 1950, Serial No. 179,642. Divided and this application January 16, 1952, Serial No. 266,794

5 Claims. (Cl. 260—461)

This application is a division of application Serial No. 179,642, filed August 15, 1950.

This invention relates to phosphate esters and relates more particularly to monopropyl dixylyl phosphate and to thermoplastic compositions containing the same.

Phosphate esters have long been used as plasticizers for the production of thermoplastic compositions, particularly vinyl resin compositions. To be suitable for this purpose, the phosphate esters should impart a good flexibility to the thermoplastic compositions containing the same, both at room temperatures and at reduced temperatures. In addition, the plasticized thermoplastic compositions should exhibit a low flammability, a high resistance to oil and water extraction and a low volatility with respect to the plasticizer, and a good stability to heat and light so that said thermoplastic compositions will retain their properties during use.

It is an important object of this invention to provide a novel phosphate ester which will fulfill the foregoing requirements when employed as a plasticizer in thermoplastic compositions and which will be simple and inexpensive to produce from readily available new materials.

A further object of this invention is to provide a thermoplastic composition plasticized with monopropyl dixylyl phosphate.

Another object of this invention is to provide a process for the production of monopropyl dixylyl phosphate.

Other objects of this invention will be apparent from the following detailed description and claims.

According to the present invention, we have found that monopropyl dixylyl phosphate is an excellent plasticizing agent for the production of thermoplastic compositions, particularly vinyl resin compositions. The monopropyl dixylyl phosphate imparts good flexibility to thermoplastic compositions containing the same both at room temperatures and reduced temperatures. In addition, the thermoplastic compositions plasticized with monopropyl dixylyl phosphate exhibit a low flammability, a high resistance to oil and water extraction and a low volatility with respect to the monopropyl dixylyl phosphate, and a good stability to heat and light so that said thermoplastic compositions retain their properties during use.

The monopropyl dixylyl phosphate is also suitable for use as a hydraulic fluid, a gas filter, a lubricant, a softener for textile sizes and finishes and the like, having a low flammability, either alone or in admixture with other materials.

The novel ester of this invention may be prepared in good yields and high purity by reacting two moles of xylenol with phosphorus oxychloride to form dixylyl monochlorophosphate, and reacting the dixylyl monochlorophosphate with n-propyl alcohol. Any dipropyl monoxylyl phosphate and trixylyl phosphate which is formed during the reaction may be separated from the monopropyl dixylyl phosphate in any suitable manner as by distillation or the like. Or, if desired, the reaction mixture obtained upon completion of the reaction between the xylenol and phosphorus oxychloride may be stripped to remove therefrom any xylyl dichlorophosphate which is formed and the final product distilled to separate the monopropyl dixylyl phosphate from any trixylyl phosphate which is formed. The xylyl dichlorophosphate which is separated from the reaction mixture may be recycled for further reaction with xylenol. The monopropyl dixylyl phosphate may then be treated with a strong oxidizing agent, such as potassium permanganate, to improve its color and remove any trace of impurities therefrom.

In carrying out the preparation of monopropyl dixylyl phosphate, a mixture containing from about 2 to 2.5 moles of xylenol for each mole of phosphorus oxychloride is heated gradually under good refluxing to a temperature of from about 110 to 275° C. or until about 2 moles of hydrogen chloride are evolved per mole of phosphorus oxychloride employed. The time and temperature required to complete the reaction may be reduced by employing a catalyst, such as anhydrous magnesium chloride, aluminum chloride, etc. After completion of the above reaction, dixylyl monochlorophosphate may be separated from any monoxylyl dichlorophosphate which is formed by fractional distillation at a pressure of 5 mm. of mercury absolute over a temperature range of 190° to 225° C. or at lower or higher pressures over correspondingly lower or higher temperature ranges. In practice, it is not essential to the preparation that the components of the above reaction mixture be separated prior to reaction with propyl alcohol. Instead, the desired monopropyl dixylyl phosphate may be separated by fractional distillation from dipropyl monoxylyl phosphate and trixylyl phosphate after reaction with propyl alcohol. To the reaction mixture, there is added from about 1 to 3.5 moles of n-propyl alcohol for each mole of dixylyl monochlorophosphate present, as determined in any suitable manner, and the mixture is heated to a temperature of about 45 to 75° C. for a period of about 1 to 6 hours. The reaction between the dixylyl monochlorophosphate and the n-propyl alcohol may advantageously be carried out in the presence of an inert diluent, which is also a non-solvent for hydrochloric acid, such as carbon tetrachloride, hexane, benzene, or the like, to reduce the solubility of hydrochloric acid in the reaction mixture and thereby assist in carrying the reaction to completion. The resultant mixture is neutralized by the addition thereto of an alkali material such as sodium carbonate, for example, and the upper aqueous phase is separated and discarded. The lower phase, containing the phosphate esters is washed to remove inorganic salts therefrom, which washing may, if desired, be carried out on a solution of the phosphate ester in an organic solvent such as ethyl ether, for example. The solvent is evaporated together with any water and propanol and the product distilled under reduced pressure to separate from the monopropyl dixylyl phosphate any dipropyl monoxylyl phosphate and trixylyl phosphate which has formed. The monopropyl dixylyl phosphate may, if desired, be treated with strong oxidizing agents, such as potassium permanganate in aqueous solution, following which, the aqueous phase is separated from the monopropyl dixylyl phosphate and the latter is distilled at reduced pressure to remove all traces of water therefrom and is finally filtered.

The novel thermoplastic compositions of this invention may be prepared by incorporating from about 10 to 150 parts by weight of monopropyl dixylyl phosphate in 100 parts by weight of an organic plastic such as, for example, a vinyl resin, including polyvinyl chlorides, vinyl chloride/vinyl acetate/copolymers and polyvinyl butyrals, a cellulose derivative, such as cellulose nitrate, cellulose acetate, cellulose propionate, cellulose butyrate, cellulose acetate propionate, cellulose acetate butyrate and ethyl cellulose, polystyrenes, polymethyl methacrylates, chlorinated rubbers, and synthetic rubbers, such as Buna N. The thermoplastic compositions may contain, in addition to the monopropyl dixylyl phosphate, other plasticizers, stabilizers, fillers, anti-blocking agents, lubricants, ultra-violet light absorbents, dyes, pigments, nacreous substances, and other effect materials.

The following examples are given to illustrate this invention further.

*Example I*

To 1185 parts by weight of phosphorus oxychloride there is added 1880 parts by weight of commercial xylenol, which comprises a mixture of isomeric xylenols, and the mixture is heated gradually over a period of 6¾ hours to a peak temperature of 272° C. at which time the hydrogen chloride evolved is equal to 2 moles for each mole of phosphorus oxychloride employed. Any monoxylyl dichlorophosphate which has formed is stripped from the reaction mixture by heating the same to a temperature of 195° C. at a pressure of about 5 mm. of mercury absolute leaving a residue of 2223 parts by weight containing 1724 parts by weight of dixylyl chlorophosphate or 69% of theory based on the phosphorus oxychloride.

To 1090 parts by weight of the stripped reaction mixture containing 845 parts by weight of dixylyl chlorophosphate there is added 345 parts by weight of n-propyl alcohol and the mixture is heated to a temperature of 45–75° C. for 6 hours. The reaction mixture is then neutralized by the addition of a solution containing 164 parts by weight of sodium carbonate dissolved in 1500 parts by weight of water. The upper aqueous phase is siphoned off and the lower phase, containing the phosphate esters, is dissolved in 1130 parts by weight of ethyl ether and washed with water to remove therefrom any inorganic salts. The ether solvent is evaporated and the crude product heated to 93° C. at a pressure of 1 mm. of mercury absolute to remove any remaining water and n-propyl alcohol. The crude product is distilled at a pressure of 1 mm. of mercury absolute and the fractions boiling between 193 and 220° C. are collected. There is obtained a yield of 707 parts by weight of monopropyl dixylyl phosphate or 78% of theory based on the dixylyl chlorophosphate in the stripped reaction product.

The monopropyl dixylyl phosphate may, if desired, be further purified by treating with charcoal, bleaches, diatomaceous earth, filter aids, etc., and filtered, or it may be simply washed and distilled.

The final product is substantially free from oxidizable materials as shown by shaking a 20 ml. sample thereof with 20 ml. of an aqueous potassium permanganate solution containing 0.34 gram per liter of potassium permanganate. At the end of 30 minutes, the aqueous phase retains its purple color.

*Example II*

To 640 parts by weight of phosphorus oxychloride there is added 6 parts by weight of aluminum chloride and 1000 parts by weight of commercial xylenol, and the mixture is heated gradually to 80° C., at which point the reaction commences, and then slowly up to 120° C. over a period of 4 hours, and then up to a peak temperature of 160° C. over a period of 2 hours. There is obtained 1275 parts by weight of a reaction mixture containing about 60% by weight dixylyl chlorophosphate.

The reaction mixture is cooled to 50° C. and there is added thereto 318 parts by weight of n-propyl alcohol. The temperature of the mixture is brought as quickly as possible to 75° C. and held at this point for 1 hour. The reaction mixture is then neutralized by the addition of an equal weight of aqueous sodium carbonate solution, containing 150 grams of sodium carbonate per liter of solution, which is added rapidly to the reaction mixture with vigorous stirring. The upper aqueous phase is siphoned off and the lower phase, containing the phosphate esters, is washed with an equal weight of water. The lower non-aqueous phase is separated and distilled at a pressure of 2 mm. of mercury absolute. There is obtained a yield of 910 parts by weight of monopropyl dixylyl phosphate, or 73% of theory based on the crude mix charged. The monopropyl dixylyl phosphate boils at 190 to 230° C. at a pressure of 2 mm. of mercury absolute, has a density of 1.116 to 1.119 at 25/25° C. and a refractive index of 1.5218 at 25° C.

*Example III*

A thermoplastic composition is prepared by blending, on a two roll mill at a temperature of 150° C., 100 parts by weight of a copolymer, containing 95% by weight of vinyl chloride and 5% by weight of vinyl acetate, with 55 parts by weight monopropyl dixylyl phosphate, 1.6 parts by weight of basic lead carbonate as a stabilizer and 0.8 parts by weight of stearic acid as a lubricant. The thermoplastic composition is sheeted off the mill at 0.055 inch thickness and molded to 0.050 inch sheets at 150° C. and 186 pounds per square inch pressure for 4 minutes, following which the sheets are cooled for 9 minutes at 500 pounds square inch pressure. Dumbbell-shaped specimens, having a width of 0.25 inch at the constriction, are cut from the 0.050 sheet and tested for strength and elongation. At 25° C., the specimens exhibit a breaking strength of 38 pounds and an elongation at the breaking point of 410%. At 0° C., the specimens exhibit a breaking strength of 57 pounds and an elongation at the breaking point of 208%. At —30° C., the specimens exhibit a breaking strength of 59 pounds and an elongation at the breaking point of 145%.

The resistance of the thermoplastic composition to water extraction is determined by immersing a 0.10 inch film of the same in water at 25° C. At the end of 5 days the film shows a total weight loss of 0.10% and at the end of 10 days the film still shows a weight loss of only 0.10%.

The resistance of the thermoplastic composition to oil extraction is determined by immersing a 0.01 inch film of the same in a mineral oil at 25° C. At the end of 10 days the film shows a total weight loss of 3.6%.

The volatility of the thermoplastic composition is determined by suspending a 3 by 8 inch specimen of 0.01 inch film in an air oven maintained at 60° C. and through which air is blown at a velocity of 2 to 3 cubic feet per minute. At the end of 10 days the film shows a total weight loss of 1.5% and at the end of 20 days the film shows a total weight loss of 2.6%.

The heat stability of the thermoplastic composition is determined by placing 0.75 by 0.5 inch specimens of 0.075 inch film on a sheet of tinplate which is maintained in an oven at a temperature of 150° C. The specimens show a noticeable discoloration after 3 hours and do not show a very bad discoloration until after 5 hours.

The light stability of the thermoplastic composition is determined by placing a 3½ by 2½ inch specimen of 0.01 inch film in a Fadeometer. At the end of 24 hours the specimen is only very slightly discolored.

Vinyl resin compositions plasticized with monopropyl dixylyl phosphate exhibit physical properties superior to those of vinyl resin compositions plasticized with other plasticizing agents commonly used for this purpose as shown in the following table.

| Physical Properties | Breaking Strength, lbs. | | | Elongation, Percent | | |
|---|---|---|---|---|---|---|
| | 25° C. | 0° C. | −30° C. | 25° C. | 0° C. | −30° C. |
| Tricresyl phosphate | 43 | 67 | 82 | 400 | 125 | 15 |
| Dioctyl phthalate | 38 | 55 | 52 | 485 | 310 | 210 |
| Mono-octyl diphenyl phosphate | 34 | 51 | 52 | 480 | 295 | 230 |
| Monopropyl dixylyl phosphate | 38 | 57 | 59 | 410 | 208 | 145 |

| | Weight Loss, Percent | | | |
|---|---|---|---|---|
| | By Extraction In— | | | By Volatilization In Circulating Air Oven at 60° C. |
| | Water | | Oil 10 Days | |
| | 5 Days | 10 Days | | 10 Days | 20 Days |
| Tricresyl phosphate | .04 | .06 | 0.6 | .14 | .23 |
| Dioctyl phthalate | .16 | .20 | 5.8 | .64 | 1.49 |
| Mono-octyl diphenyl phosphate | .12 | .18 | 8.0 | 1.9 | 4.5 |
| Monopropyl dixylyl phosphate | .10 | .10 | 3.6 | 1.5 | 2.6 |

While the vinyl resin compositions plasticized with monopropyl dixylyl phosphate suffer a greater loss in elongation at reduced temperatures than certain vinyl resin compositions plasticized with other plasticizing agents, their elongation at these reduced temperatures is fully adequate for commercial use. In addition, the monopropyl dixylyl phosphate plasticized vinyl resin compositions will retain their properties during use owing to their improved resistance to extraction and volatilization, whereas vinyl resin compositions plasticized with certain other plasticizing agents will suffer a progressive loss in properties during use as the plasticizing agents are extracted and volatilized therefrom.

Example IV

A 2-mil film is prepared by casting onto a smooth surface a solution containing 100 parts by weight of cellulose acetate having an acetyl value of 54.5, calculated as acetic acid, 30 parts by weight of monopropyl dixylyl phosphate and 300 parts by weight of acetone. The film is stripped from the casting surface and heated to 160° C. in an oven to eliminate all traces of acetone therefrom. The resultant solvent-free film is clear and tough and does not support combustion. On chewing the film, absolutely no taste can be detected, indicating the suitability of the monopropyl dixylyl phosphate as a plasticizer for food wrapping materials.

Example V

To 100 parts by weight of finely ground cellulose propionate containing 0.3 free hydroxyl groups per glucoside unit, there is added 30 parts by weight of monopropyl dixylyl phosphate as prepared in Example I. After stirring the mixture well, it is molded for 15 minutes at 200° C. to form a disc. The disc is clear and tough and non-brittle when subjected to shock.

Example VI

A thermoplastic composition is prepared by blending, on heated malaxating rolls, 100 parts by weight of ethyl cellulose flake and 30 parts by weight of monopropyl dixylyl phosphate. The thermoplastic composition is sheeted off the malaxating rolls, ground in a chip grinder and injection molded in the form of ⅛″ x ½″ x 5″ impact bars. The bars are clear and exhibit an impact strength of about 8 ft. lb./in. notch at room temperatures and an excellent impact strength at reduced temperatures.

It is to be understood that the foregoing detailed description is given merely by way of illustration and that many variations may be made therein without departing from the spirit of our invention.

Having described our invention, what we desire to secure by Letters Patent is:

1. Monopropyl dixylyl phosphate.
2. Process for the production of monopropyl dixylyl phosphate which comprises reacting xylenol with phosphorus oxychloride to form dixylyl monochlorophosphate, separating xylyl dichlorophosphate which is formed from the reaction mixture, reacting the dixylyl monochlorophosphate with n-propyl alcohol, and separating the monopropyl dixylyl phosphate from the reaction mixture.
3. Process for the production of monopropyl dixylyl phosphate which comprises reacting from about 2 to 2.5 moles of xylenol with 1 mole of phosphorus oxychloride to form dixylyl monochlorophosphate, separating xylyl dichlorophosphate which is formed from the reaction mixture, reacting each mole of dixylyl monochlorophosphate with from about 1 to 3.5 moles of n-propyl alcohol, and separating the monopropyl dixylyl phosphate from the reaction mixture.

4. Process for the production of monopropyl dixylyl phosphate which comprises reacting from 2 to 2.5 moles of xylenol with one mole of phosphorus oxychloride at a temperature of from about 110 to 275° C. to form dixylyl monochlorophosphate, separating xylyl dichlorophosphate which is formed from the reaction mixture, reacting each mole of dixylyl monochlorophosphate with from about 1 to 3.5 moles of n-propyl alcohol at a temperature of from about 45 to 75° C., and separating the monopropyl dixylyl phosphate from the reaction mixture.

5. Process for the production of monopropyl dixylyl phosphate which comprises reacting from 2 to 2.5 moles of xylenol with one mole of phosphorus oxychloride at a temperature of from about 110 to 275° C. to form dixylyl monochlorophosphate, stripping xylyl dichlorophosphate which is formed from the reaction mixture, reacting each mole of dixylyl monochlorophosphate with from about 1 to 3.5 moles of n-propyl alcohol at a temperature of from about 45 to 75° C. for a period of from about 1 to 6 hours, and separating the monopropyl dixylyl phosphate from trixylyl phosphate which is formed.

WILLIAM B. HORBACK.
FRANK BERARDINELLI.
WALTER D. PAIST.

References Cited in the file of this patent
UNITED STATES PATENTS

| Number | Name | Date |
|---|---|---|
| 2,078,421 | Sherman | Apr. 27, 1937 |
| 2,168,587 | Sherman | Aug. 8, 1939 |
| 2,504,121 | Gamrath | Apr. 18, 1950 |
| 2,596,141 | Gamrath et al. | May 13, 1952 |